United States Patent
Odziemczyk et al.

(10) Patent No.: US 11,095,725 B2
(45) Date of Patent: Aug. 17, 2021

(54) TRANSPORTING DATA OUT OF ISOLATED NETWORK ENVIRONMENTS

(71) Applicant: EMC IP Holding Company LLC, Hopkinton, MA (US)

(72) Inventors: Anna Agnieszka Odziemczyk, Cork (IE); Michael William Hurley, Cork (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/526,117

(22) Filed: Jul. 30, 2019

(65) Prior Publication Data

US 2021/0037102 A1 Feb. 4, 2021

(51) Int. Cl.
| | |
|---|---|
| G06F 15/16 | (2006.01) |
| H04L 29/08 | (2006.01) |
| H04L 29/06 | (2006.01) |
| H04L 12/26 | (2006.01) |

(52) U.S. Cl.
CPC ......... *H04L 67/148* (2013.01); *H04L 43/062* (2013.01); *H04L 67/025* (2013.01); *H04L 69/161* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,523,191 B1* | 4/2009 | Thomas | G06F 11/3438 709/202 |
| 2002/0143933 A1* | 10/2002 | Hind | H04L 67/22 709/224 |

OTHER PUBLICATIONS

"Window sessionStorage Property", w3schools.com, https://www.w3schools.com/jsref/prop_win_sessionstorage.asp, Last Accessed Jul. 26, 2019. 8 pages.
"$http", angularjs.org, angularjs.org, https://docs.angularjs.org/api/ng/service/$http, Last Accessed Jul. 26, 2019. 11 pages.
"Greenplum Database—GPDB", dbaref.com, http://www.dbaret.com/greenplum, Last Accessed Jul. 26, 2019. 15 pages.
"Interface ContainerRequestFilter", docs.oracle.com, https://docs.oracle.com/javaee7/api/javax/ws/rs/container/ContainerRequestFilter.html. Last Accessed Jul. 26, 2019. 2 pages.
"Java(TM) EE 7 Specification APIs", docs.oracle.com, https://docs.oracle.com/javaee/7/api/toc.htm. Last Accessed Jul. 26, 2019. 7 pages.

* cited by examiner

*Primary Examiner* — Padma Mundur
(74) *Attorney, Agent, or Firm* — Amin, Turocy & Watson, LLP

(57) ABSTRACT

The described technology is generally directed towards transporting data out of isolated network environments. According to an embodiment, a system can comprise a processor, and a memory that stores executable instructions that, when executed by the processor, facilitate performance of operations, that include receiving a request string comprising request data related to a request from a first application of a device. The operations further include intercepting a processing of the request string, and based on the intercepting, extracting usage data of a second application of the device encoded in the request string, wherein the usage data is unrelated to the request.

20 Claims, 10 Drawing Sheets

600 ⤵

```
{
"zoneKey":
    {
    "name":"Settings","templateUrl":"component/em_smc/src/
    main/ts/settings/view/
    SystemSettingsDialog.html","controllerName":"SystemSett
    ingsController"
    },

. . .

"components":[
    {
    "componentKey":{
    "componentId":"settings-sections-performance-
    preferences-menu-item",
    "componentType":"DIV",
        "offsetTop":68,
        "offsetLeft":0,
        "offsetHeight":30,
        "offsetWidth":215
    }, "actions":
[
    {
    "invocationTimes":[1543424352],
    "actionType":"CLICK",
    "context":"ALL_SYSTEMS"
    }
]

},
    {
    "componentKey":{
    "componentId":"Common.CLOSE_BUTTON_LABEL",
    "componentType":"BUTTON",
        "offsetTop":702,
        "offsetLeft":978,
        "offsetHeight":36,
        "offsetWidth":88
},
```

*FIG. 6*

TRANSPORTING DATA OUT OF ISOLATED NETWORK ENVIRONMENTS

TECHNICAL FIELD

The subject application generally relates to network communications, and, for example, to transporting data out of isolated network environments, and related embodiments.

BACKGROUND

Modern applications are increasingly designed with multiple components distributed across computing devices, e.g., including client/server applications with distributed functions, where log data is collected on a client device. In some circumstances, problems can occur when collected data on a client device is communicated to other devices for analysis.

One approach taken to address these problems is to establish a direct connection for log data between a client device and a web server or other device. This approach however can cause problems because it can require additional types of connections with the client device beyond the application client/server protocols, e.g., HyperText Transfer Protocol (HTTP).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a network device can comprise a processor, and memory that stores executable instructions that, when executed by the processor, facilitate performance of operations, that include receiving a request string comprising request data related to a request from a first application of a device. The operations further include intercepting a processing of the request string, and based on the intercepting, extracting usage data of a second application of the device encoded in the request string, wherein the usage data is unrelated to the request.

Further, the operations of the embodiment can further include receiving a request string comprising request data related to a request from a first application of a device. The operations can further include intercepting a processing of the request string, and based on the intercepting, extracting usage data of a second application of the device encoded in the request string, wherein the usage data is unrelated to the request.

Further in the embodiment, the request string can have been generated by the first application of the device generated by combining the request data and the usage data of the second application. Further, the first application can be a web browser application and the device can have temporarily stored the usage data of the second application in session storage associated with a session state of the web browser application. In addition, the embodiment can further include operations that generate a header that can include a signal for the device, append the header to a response string; and communicate the response string to the device. Further, the signal can comprise a device signal encoding an instruction to the device to continue to collect the usage data of the second application, resulting in updated usage data, and to send the updated usage data to the network device. In the embodiment of the network device, the signal can be a device signal that encodes an instruction to the device to iteratively communicate incremental usage data of the second application to the network device, with the incremental usage data not having been previously communicated to the network device as part of a previous usage data communication. In further features, the embodiment the request string can comprise a hypertext markup language request string.

According to another embodiment, a computer-implemented method can comprise intercepting, by a device comprising a processor, a request string, generated by a first application, for communication to a network device. The method can further comprise combining, by the device, a message with the request string, wherein the message comprises usage data associated with usage of a second application, the combining resulting in combined information. The method can further comprise communicating, by the device, the combined information to the network device for an extraction, by the network device, of the message from the combined information. Further, in an embodiment, the first application of the method can comprise a web browser application. Further, in an embodiment of the method, usage data of the second application is aggregated and temporarily stored in session storage of the web browser application. In additional embodiments, the method can further comprise receiving, by the device, a response string from the network device, extracting, by the device, a signal from the response string, and based on the signal, changing, by the device, operation of the first application, resulting in a changed operation of the first application. In some embodiments of the method, the signal can comprise a first application signal to the first application to continue to collect the usage data of the second application, and the changed operation of the first application can comprise directing the first application to aggregate the usage data of the second application, resulting in aggregated usage data, and the message can comprise the aggregated usage data of the second application.

In further embodiments of the method, intercepting the request string can include detecting a hypertext transfer protocol request, with the request string comprising the hypertext transfer protocol request. The method can further include starting an interceptor process based on the detecting the hypertext transfer protocol request, and intercepting, by the device executing the interceptor process, the hypertext transfer protocol request. In additional embodiments, the method can further comprise monitoring, by the device, traffic being communicated to the network device, and based on a result of the monitoring of the traffic, pausing, by the device, the communicating of the request string to the network device. In alternative or additional embodiments, the method can further comprise monitoring, by the device, a size of the request string, and based on a result of the monitoring of the size of the request string, pausing, by the device, the communicating the request string to the network device for a defined amount of time.

According to another embodiment, a computer program product is provided. The computer program product can comprise machine-readable storage medium comprising executable instructions that, when executed by a processor, can facilitate performance of operations comprising receiving a request command and request data from a first application of a device. The operations can further comprise intercepting a processing of the request command and the request data, and extracting usage data associated with usage of a second application from the request data, wherein the usage data is encoded usage data that is encoded in the request data.

In further embodiments of the computer program product, the request command can comprise a hypertext markup language post command, with a hypertext markup language get command being transformed into the hypertext markup language post command, and the operations further including operations to transform the hypertext markup language post command by returning the hypertext markup language post command to the hypertext markup language get command.

BRIEF DESCRIPTION OF THE DRAWINGS

The technology described herein is illustrated by way of example and not limited in the accompanying figures in which like reference numerals indicate similar elements, and in which:

FIG. 6 depicts a portion of a JavaScript Object Notation (JSON) file that can be transported based on embodiments herein.

DETAILED DESCRIPTION

Various aspects described herein are generally directed towards facilitating the transport of data out of isolated network environments, in accordance with one or more embodiments. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., encoding data for transport out of isolated network environments), that are not abstract and cannot be performed as a set of mental acts by a human. For example, a human, or even a plurality of humans, cannot efficiently, accurately and effectively, manually evaluate, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
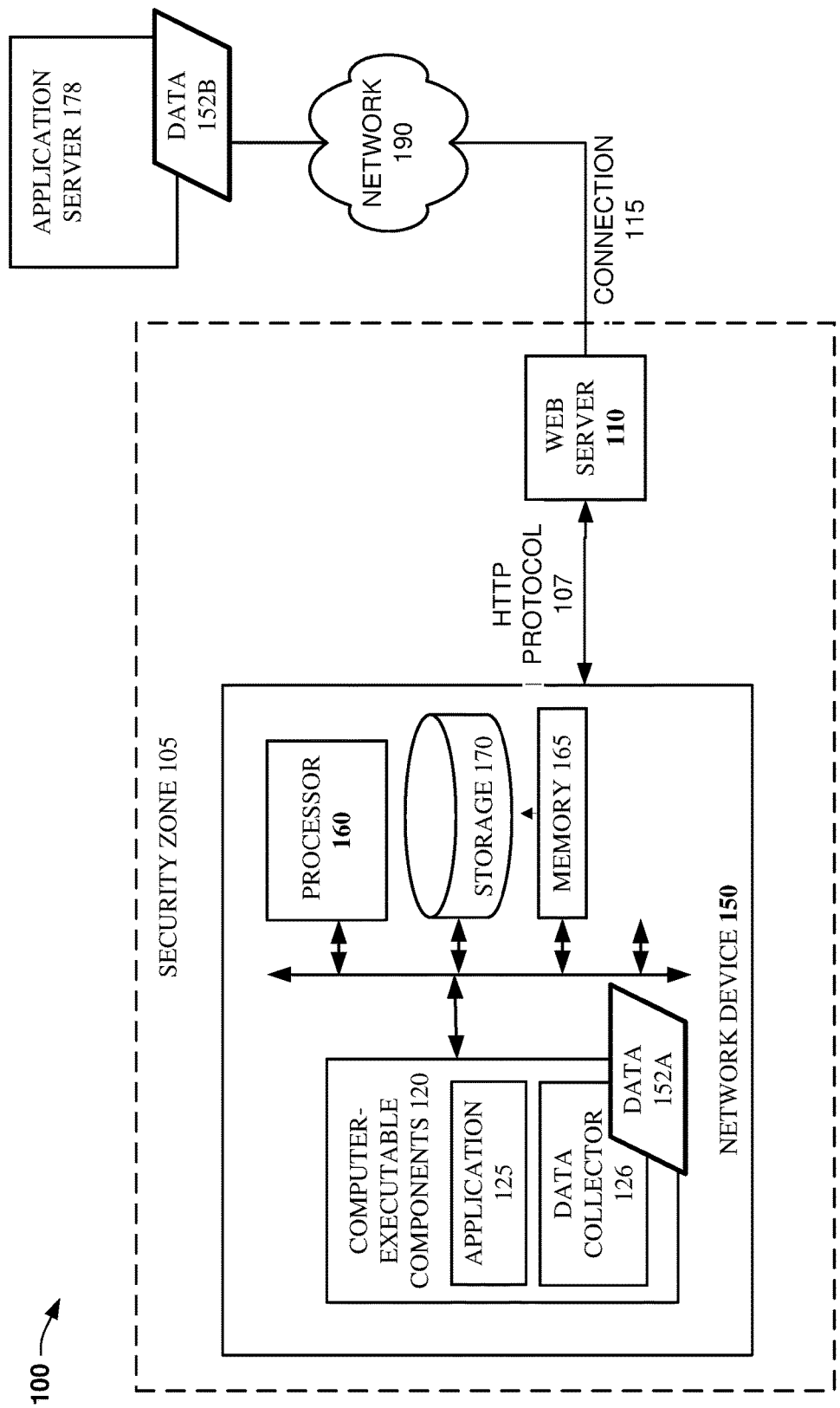
FIG. 1 illustrates a block diagram of an example, non-limiting system that can facilitate transport of data out of isolated network environments, in accordance with various aspects and implementations of the subject disclosure.

FIG. 1 illustrates a block diagram of an example, non-limiting system 100 that can facilitate transport of data 152A out of isolated network environments, in accordance with various aspects and implementations of the subject disclosure. An example of data 152A transported and the circumstances under which one or more embodiments can be employed concerns the transport of UI usage data for a thin client side of a web application to a server-side of the web application, e.g., from network device 150 to application server 178 via web server 110.

As depicted, network device 150 includes processor 160, storage 170, memory 165, and computer-executable components 120. As discussed further below with FIG. 10, in some embodiments, memory 165 and storage 170 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 and storage 170 are described below with reference to system memory 1016 and FIG. 10. Such examples of memory 165 and storage 160 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored, e.g., in memory 165. For example, processor 160 can perform various operations that can be specified by such computer and/or machine readable, writable, and/or executable components 120 and/or instructions including, but not limited to, logic, control, input/output (I/O), arithmetic, and/or the like.

In one or more embodiments, in an example approach to implementing one or more embodiments described herein, processor 160 can execute computer-executable components 120 that include application 125, data collector 126, and components described with FIG. 2 below. It should be noted that example components depicted with figures referenced herein are included as examples, and the features of the component can be combined during implementation. For example, while computer-executable components 120 can include the components described herein as distinct components, in alternative implementations these functions can be closely integrated, e.g., being performed together, and not independent processes, as described herein.

As depicted, network device 150 can be coupled to web server 110 via an HTTP protocol connection 107. One application of this coupling is to transport data 152A to application server 178 where it is labeled as data 152B. In some implementations, data 152A-B can be log data collected by monitoring (e.g., by data collector 126) a client-side web application, e.g., application 125. In a common application operation, after collection, log data 152A can be transported via web server 110 and network 190 for analysis by applications operating on application server 178. Further, application server 178 can be external analytics server configured to analyze data 152A.

As noted above, the examples presented herein are non-limiting, and other variations of embodiments possible, including different types of data, and different network security procedures than the ones described below. For example, in alternative or additional embodiments, other data about the operation of network device 150 can be sent to application server 178 besides the usage log data frequently used with examples herein, e.g., detected run-time error (e.g., a discrepancy between the server time and thin client time) can be relayed to application server 178 by the transport processes described herein.

In one or more embodiments, security zone 105 can be a security zone of an enterprise in which application 125 operates. In some examples discussed herein, data application 125 data 152A can be analyzed by applications of application server 178. In an illustrative example, data 152A can be communicated from network device 150 to web server 110 using HTTP protocol 107 (e.g., using encoding approaches described herein), and this data is communicated by web server 110 to application server 178 (e.g., data 152B) by connection 115. In one or more embodiments, connection 115 can be a secure connection, e.g., to relay data 152A outside security zone 105 to application 178 via network 190. Different aspects of this transport are described with FIG. 2-3 below, and throughout this disclosure.

Figure 2:
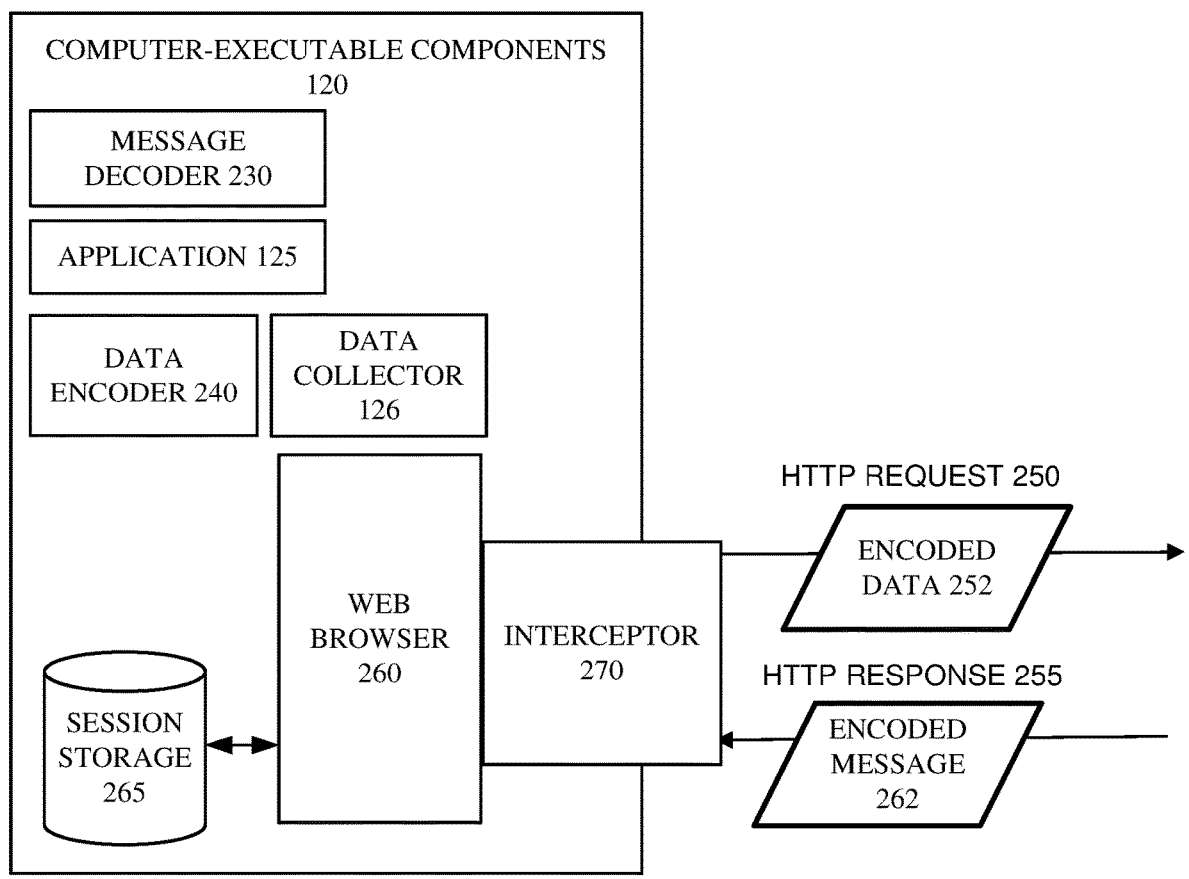
FIG. 2 illustrates an implementation of an example, non-limiting system that can facilitate transport of data from network device 150, in accordance with one or more embodiments described herein.

FIG. 2 illustrates an implementation of an example, non-limiting system 200 that can facilitate transport of data 152A from network device 150 in accordance with one or more embodiments described herein. Repetitive description of like elements and/or processes employed in respective embodiments is omitted for sake of brevity. As depicted, computer-executable components 120 can further include message decoder 230, data encoder 240, interceptor 250, and web browser 260.

In an exemplary embodiment discussed below, to facilitate the transport of data 152A out of a isolated network environment (e.g., isolated by only being connected to web server 110 via HTTP protocol 107), the data can be transported by encoding the data into intercepted HTTP requests 250 generated by web browser 260, e.g., encoded data 252.

As noted above data collector 126 can collect data 152A for transport to application server 178. Once collected, in one or more embodiments data 152A can be temporarily stored for incremental transport with HTTP requests 250. To facilitate the combining of data 152A with HTTP request 250, interceptor 270 can monitor outgoing HTTP traffic from network device 150. In one or more embodiments, when a selected type of hypertext markup language (HTML) statement that is addressed to application server 178 is detected, interceptor 270 can temporarily pause the transmission of the statement.

Example HTML statements that can be intercepted and paused for use by one or more embodiments include HTML statements otherwise used for other functions, e.g., GET methods. In some circumstances, because they are for retrieving a particular application resource, HTML statements with the "GET" method can be one type of HTML statement detected, paused, and used for encoding data by one or more embodiments, e.g., statements generated by web browser 260 used to relay encoded data 252 to web server 110. In alternative or additional embodiments, other types of HTML statements can be used. For example, a HTTP GET request could be transformed to a POST in order to transport data 152A in the POST statement payload, this POST statement being transformed back to a GET statement upon decoding, e.g., by data decoder 314 on the server side, discussed with FIG. 3 below.

As discussed further with FIG. 3 below, it is important to note that the HTML statement detected and used for encoding need not be related to data 152A or application 125, and the statement can be intercepted by web server 110 for other uses, the normal processing of the HTTP protocol command, e.g., independent of data 152A added by one or more embodiments. Thus, interceptor 270 can receive and relay a request string (e.g., HTTP GET method statement) comprising request data related to a request (e.g., an unrelated request for retrieval of other data from application 125 or other applications or processes).

Further, one or more embodiments can receive messages (e.g., instructions) from web server 110 by employing a similar process in reverse. As described in FIG. 3 below, in one or more embodiments encoded message 262 can be message encoded into HTTP response 255 that commands component of network device 150 to perform different functions, e.g., for data collector 126 to begin, continue, or stop collecting data, along with other related functions described below.

Once a selected HTML statement is intercepted and paused, in one or more embodiments, data encoder 240 can process a portion of data 152A to be encoded data 252, e.g., encoded to be a part of HTTP request 250. In one or more embodiments data 152A can be incorporated into a POST method statement then encoded by data encoder 240 into a method statement. FIG. 6 below illustrates example data that can be collected, encoded, and transported by one or more embodiments. The decoding and use of encoded data 252 (e.g., by application server 178) is described with the description of FIG. 3 below.

Returning to the collection of data 152A by data collector 126, for one or more embodiments, based in part in the incremental approach used to encode data 152A into HTTP request 250, once collected, data 152A can be temporarily stored for encoding over time. In an example where application 125 is part of a web-based application executed by web browser 260, collected data can be temporarily stored in session storage 265 or other storage locations. Advantages to utilizing session storage 265 for this purpose is that this storage can be easily retrieved during the incremental encoding process described above, and that it can offer more flexibility as to how when data 152A is collected by data collector 126. Related to this flexibility in collecting data, one or more embodiments can flexibly select advantageous times to transport data 152A with other traffic, as described above. These advantageous times (e.g., off-peak times) can be selected by one or more embodiments, for example, based on network traffic information monitored and analyzed by interceptor 270, e.g., from its placement as a receiver of selected portions (or all) of the outbound and inbound HTTP traffic.

Session storage 265 can be implemented using localStorage and sessionStorage objects that can include properties that allow the saving of key/value pairs by and for web browser 260. In some implementations, a sessionStorage object is used that can store data for only one session, e.g., the data is deleted when the application browser tab is closed, and thus one or more embodiments can expedite the transport of the data before it is erased. In alternative embodiments, the localStorage property can be used that stores data with no expiration date, in an example implementation, maintaining the data until web browser 260 is closed.

Figure 3:
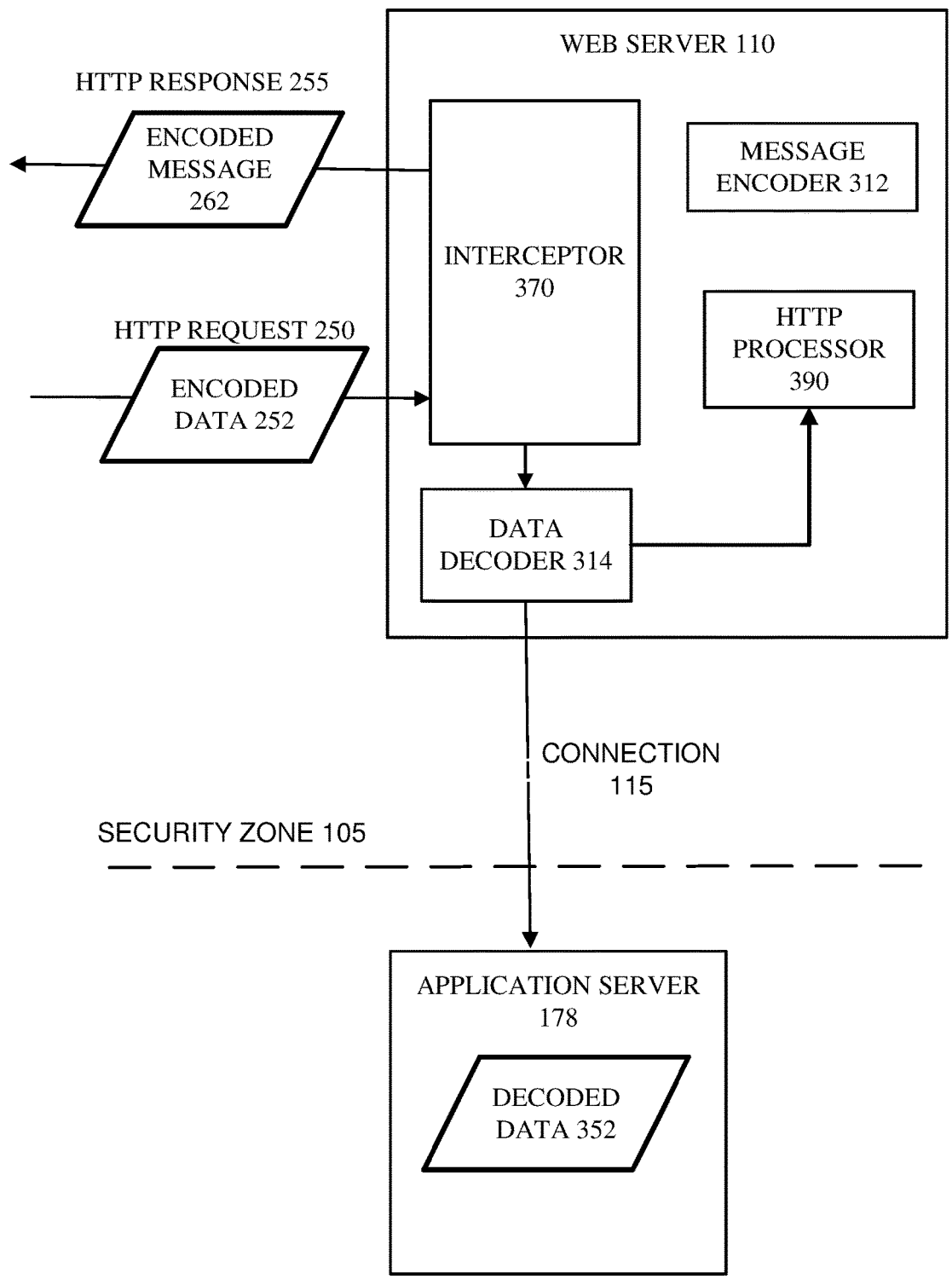
FIG. 3 depicts non-limiting example of application server discussed above combined with web server to facilitate the receiving and use of encoded data from network device, in accordance with one or more embodiments.

FIG. 3 depicts non-limiting example 300 of application server 178 discussed above combined with web server 110 to facilitate the receiving and use of encoded data 252 from network device 150, in accordance with one or more embodiments. Repetitive description of like elements and/or processes employed in respective embodiments is omitted for sake of brevity.

In one or more embodiments, web server 110 can be the receiver and processor of HTTP request 250, e.g., with processing elements being executed by a web server application, e.g., discussed with FIG. 5 below. Similar to interceptor 270 of network device 150, web server 110 can have interceptor 370 configured to monitor HTTP traffic for a HTTP request 250 with encoded data 252. Once detected and received, encoded data 252 can be decoded by data decoder 314, resulting in the original data 152A being passed as decoded data 352 to application server 178 for use outside of security zone 105, e.g., analysis of log data collection based on the operation of application 125. Further, during the decoding if encoded data 252 is combined with an unrelated HTTP request, this request can be routed (e.g., by data encoder 314) for normal processing, e.g., by HTTP processor 390.

As noted with FIG. 2 above, in one or more embodiments, web server 110 can further comprise a message encoder 312 to facilitate messaging back to the data collection and transport processes of network device 150. This message can be generated, for example, by application server 178, to change operation of elements of the data collection process on network device 150, e.g., commanding data collector 126 to begin, pause, or end collection, and commands for interceptor 270, e.g., times for sending data, times to pause interception of outgoing HTTP requests 250 or incoming HTTP responses 255. In an example, commands can be generated by application server 178, relayed by connection 115 to web server 110, encoded into encoded message 262 by message encoder 312, transferred to network device 150 via HTTP response 255 to network device 150, and decode by message decoder 230 for direction to the components for which it was generated, e.g., data collector 126.

One approach that can be used by one or more embodiments to generate encoded message 262 is to detect and intercept (e.g., by interceptor 370) an HTTP response sent by web server 110 in response to HTTP request 250, e.g., for an unrelated purpose. In one or more embodiments, this intercepted response message can contain a standard HTML header into which the message encoded by message encoder 312 can be included.

Figure 4:
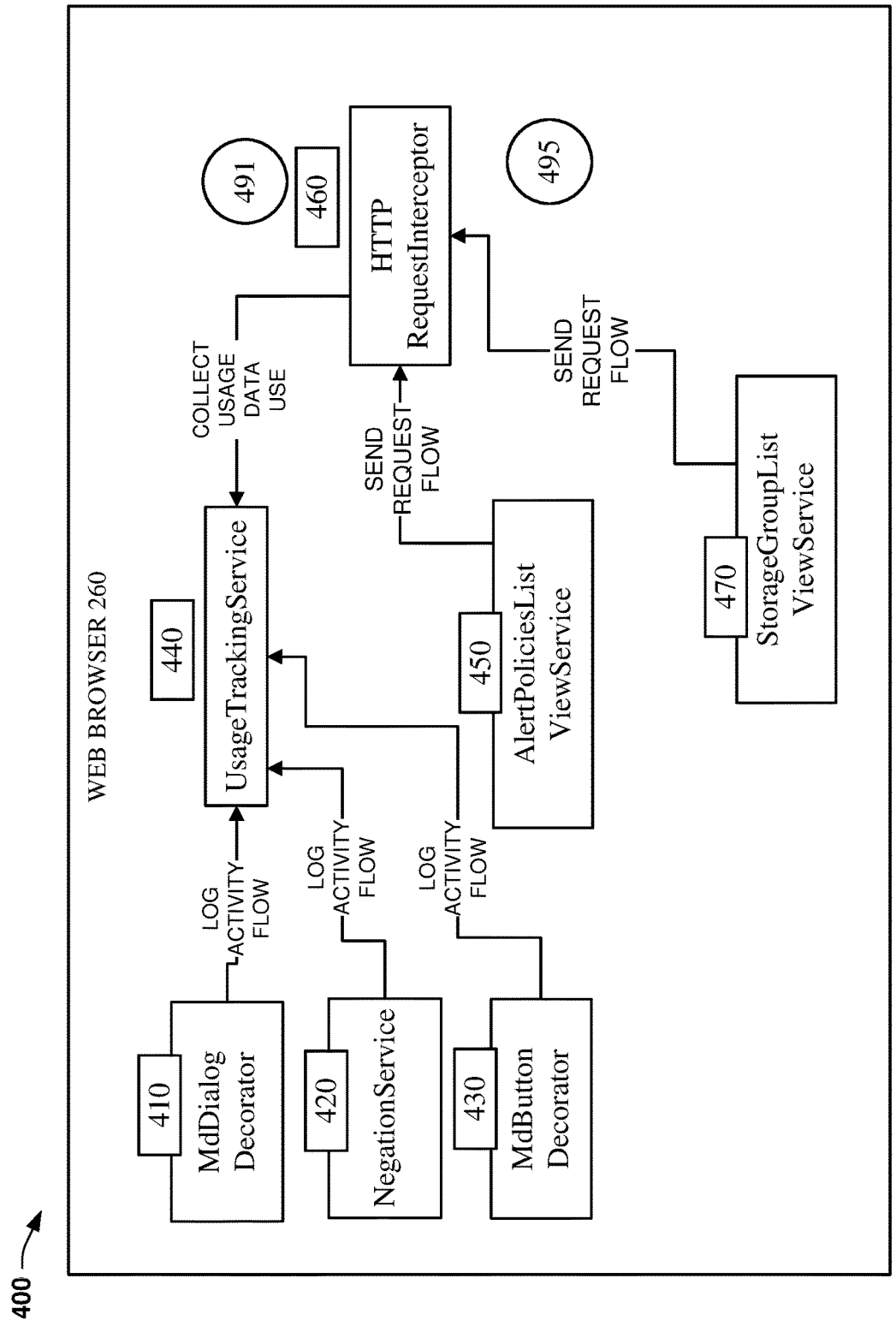
FIG. 4 depicts an example frontend deployment diagram for the implementation of features of one or more embodiments using Java and JavaScript.
Figure 5:
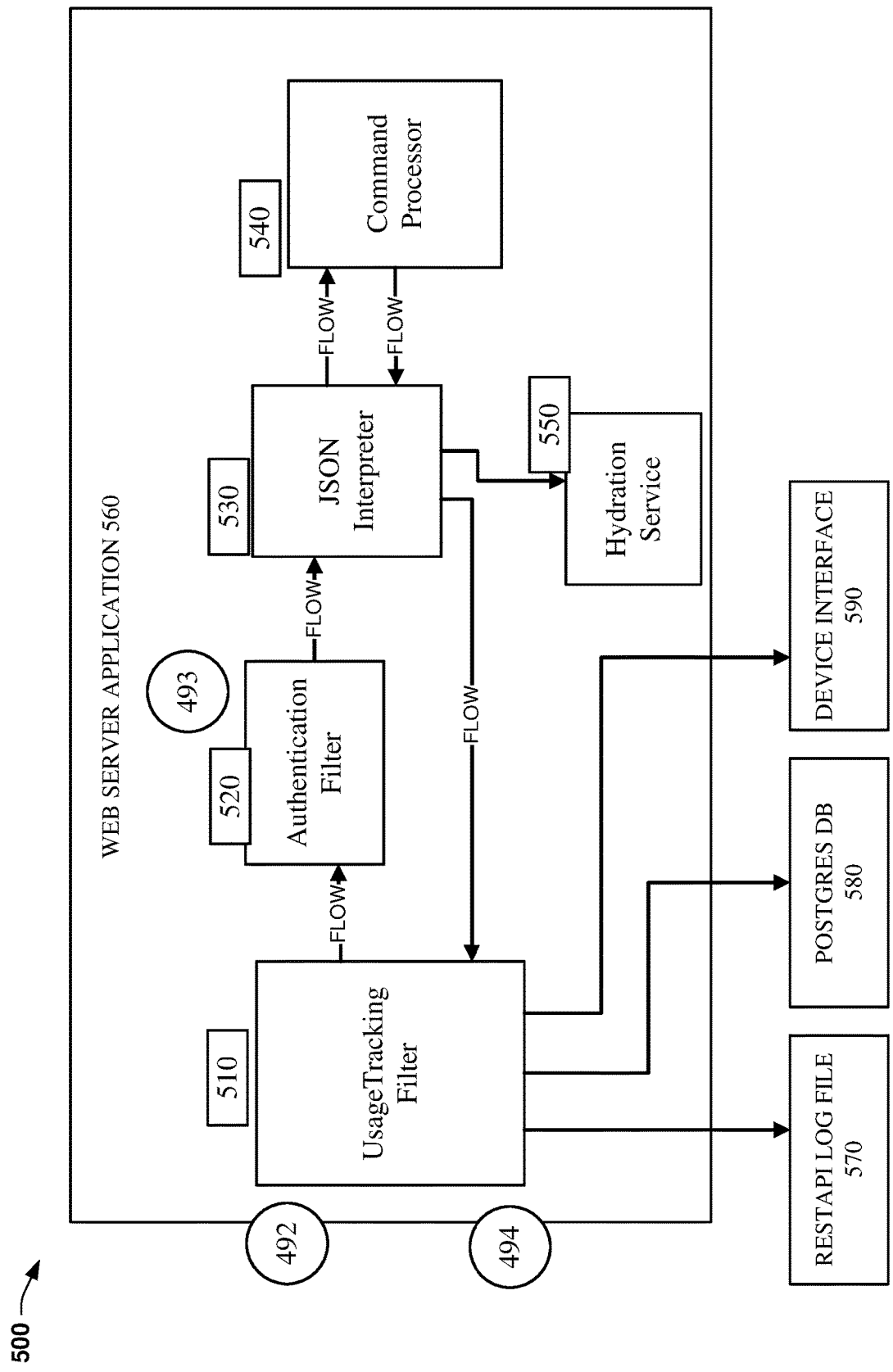
FIG. 5 depicts an example backend deployment diagram for the implementation of features of one or more embodiments using Java.

FIGS. 4-5 are used to illustrate an example sequence of processes described above, in the context of client and server deployment diagrams for an example implementation of one or more embodiments described herein.

FIG. 4 depicts an example frontend deployment diagram 400 for the implementation of features of one or more embodiments using Java and JavaScript. FIG. 5 depicts an example backend deployment diagram 500 for the implementation of features of one or more embodiments using Java. Repetitive description of like elements and/or processes employed in respective embodiments is omitted for sake of brevity. In the example deployment depicted in FIGS. 4-5, the backend deployment depicted in FIG. 5 is implemented using Java, and the frontend deployment depicted in FIG. 4 is implemented using JavaScript, e.g., using the AngularJS frontend web framework, particularly for the development of single-page JavaScript applications. In this example, an Angular service can be configured to collect UI usage data from the frontend application, and store this collected data in session storage 265 of web browser 260, as described above with FIG. 2. It should further be noted that, although the components shown in FIGS. 4-5 can provide details for many different embodiments, in one or more embodiments, web server application 560 can be an implementation of the Unisphere application running on a PowerMax Server, provided by DELL EMC.

It should be noted that FIGS. 4-5 are included herein as a more detailed example of a Java/JavaScript implementation of one or more embodiments and, as such, details are included (e.g., some components shown in the figures) that are not described further herein. One having skill in the relevant art(s), given the disclosure herein, would appreciate how these components relate to described components and to the broader disclosure of various embodiments described herein.

Label 491 begins the process whereby an instance of interceptor 270 (e.g., RequestInterceptor 460) intercepts and HTTP request 250 from web browser 260 directed to web server 110. When data to be transported (e.g., log data collected by data collector 126) is queued (e.g., in session storage 265) for transport, data encoder 240 can encode the data, as described above.

The example process continues on FIG. 5, where label 492 highlights an instance of interceptor 370 (e.g., UsageTrackingFilter 510) that can receive HTTP request 250 and decode (e.g., by data decoder 314) encoded data 252 as described above. In an example described further with FIG. 6 below, data 152A can be formatted using JSON for use by application server 178.

Label 493 highlights an instance of AuthenticationFilter 520 which can be used to facilitate the processing of the original HTTP request by web server application 560 (e.g., by HTTP processor 390). Label 494 highlights UsageTrackingFilter 510, that can generate encoded message 262 to command elements of web browser 260 and network device 150 to continue collecting and sending encoded data 252. Label 495 returns to FIG. 4, where the instance of interceptor 270 (e.g., RequestInterceptor 460) can intercept HTTP response and extract encoded message 262 to determine the instructions and forward to appropriate components.

FIG. 6 depicts a portion of a JSON file 600 that can be transported based on embodiments herein. For purposes of brevity, description of like elements and/or processes employed in other embodiments is omitted.

As described with FIGS. 2-3 above, or more embodiments can be used collect and encode for transport any type of data. Examples throughout this disclosure involve the transport of log data from a client device to a server device for analysis. To illustrate generally how different types of data can be formatted (e.g., by using JSON), and specifically, ho log data can be formatted, FIG. 6 includes a portion of data 152A to be transported. One having skill in the relevant art(s), given the description herein, will appreciate the structure of JSON, and that other formats can be used to encode data for transport by one or more embodiments described herein.

Figure 7:
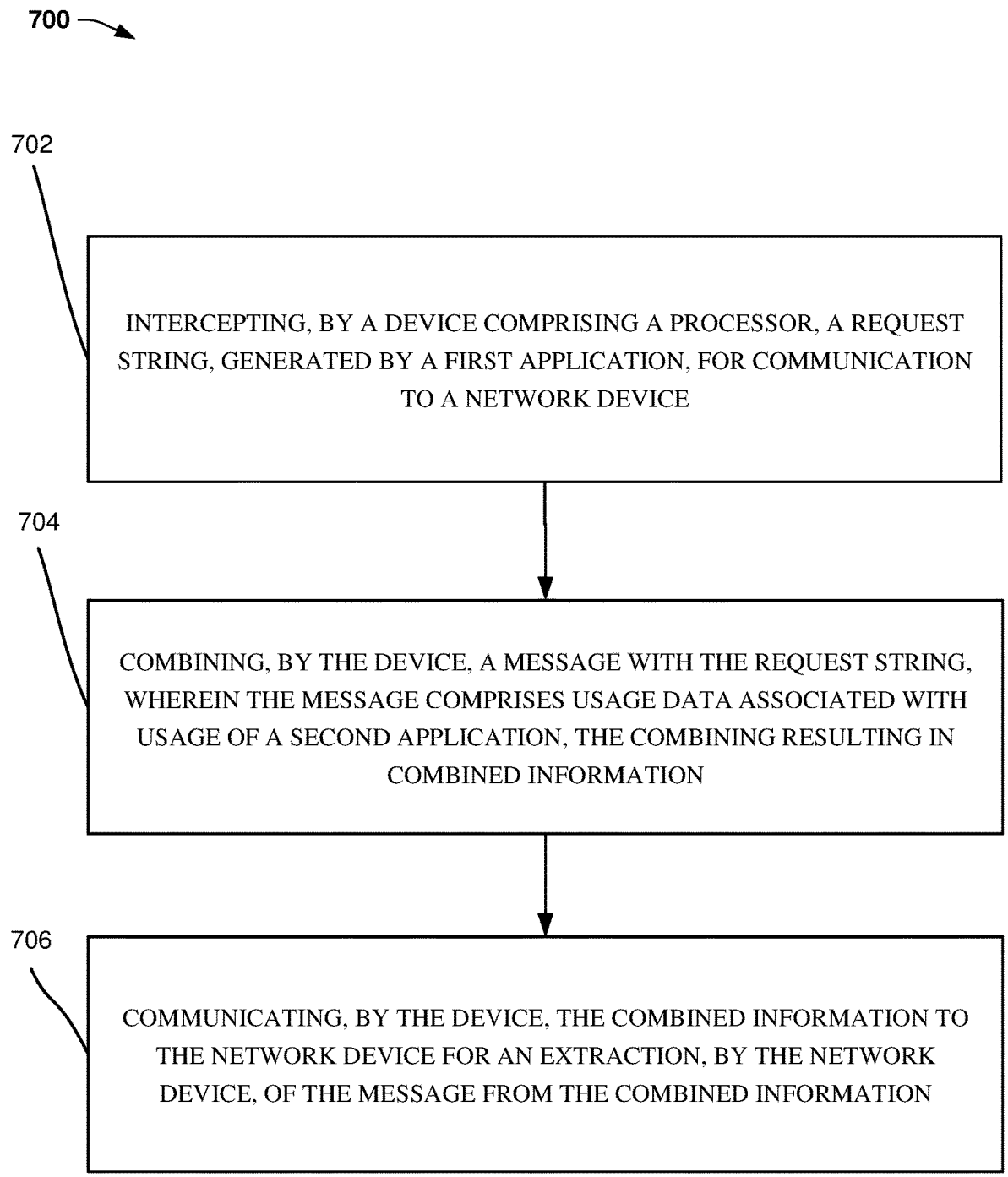
FIG. 7 illustrates an example flow diagram for a method that can facilitate transport of data out of isolated network environments, in accordance with one or more embodiments.

FIG. 7 illustrates an example flow diagram for a method 700 that can facilitate transport of data 152A out of isolated network environments, in accordance with one or more embodiments. For purposes of brevity, description of like elements and/or processes employed in other embodiments is omitted.

At element 702, method 700 can comprise intercepting, by a device comprising a processor, a request string, generated by a first application, for communication to a network device. For example, in an embodiment, method 700 can intercept a request string (e.g., a GET method HTML statement), generated by a first application (e.g., web browser 260), for communication to a network device (e.g., application server 178) via web server 110.

At element 704, method 700 can comprise combining, by the device, a message with the request string, wherein the message comprises usage data associated with usage of a second application, the combining resulting in combined information. For example, in an embodiment, method 700 can combine a message (e.g., data 152A) with the request string (e.g., unrelated to data 152A), wherein the message comprises usage data (e.g., collected by data collector 125) associated with usage of a second application (e.g., application 125), the combining resulting in combined information (e.g., encoded data 252 in HTTP request 250).

At element 706, method 700 can comprise communicating, by the device, the combined information to the network device for an extraction, by the network device, of the message from the combined information. For example, in an embodiment, method 700 can communicate (e.g., by employing network adapter 1058) the combined information (e.g., HTTP request 250 having encoded data 252) to the network device (e.g., via LAN 1054 and network 190 to web server 110) for an extraction (e.g., by data decoder 314), by the network device, of the message (e.g., log data 152A) from the combined information.

Figure 8:
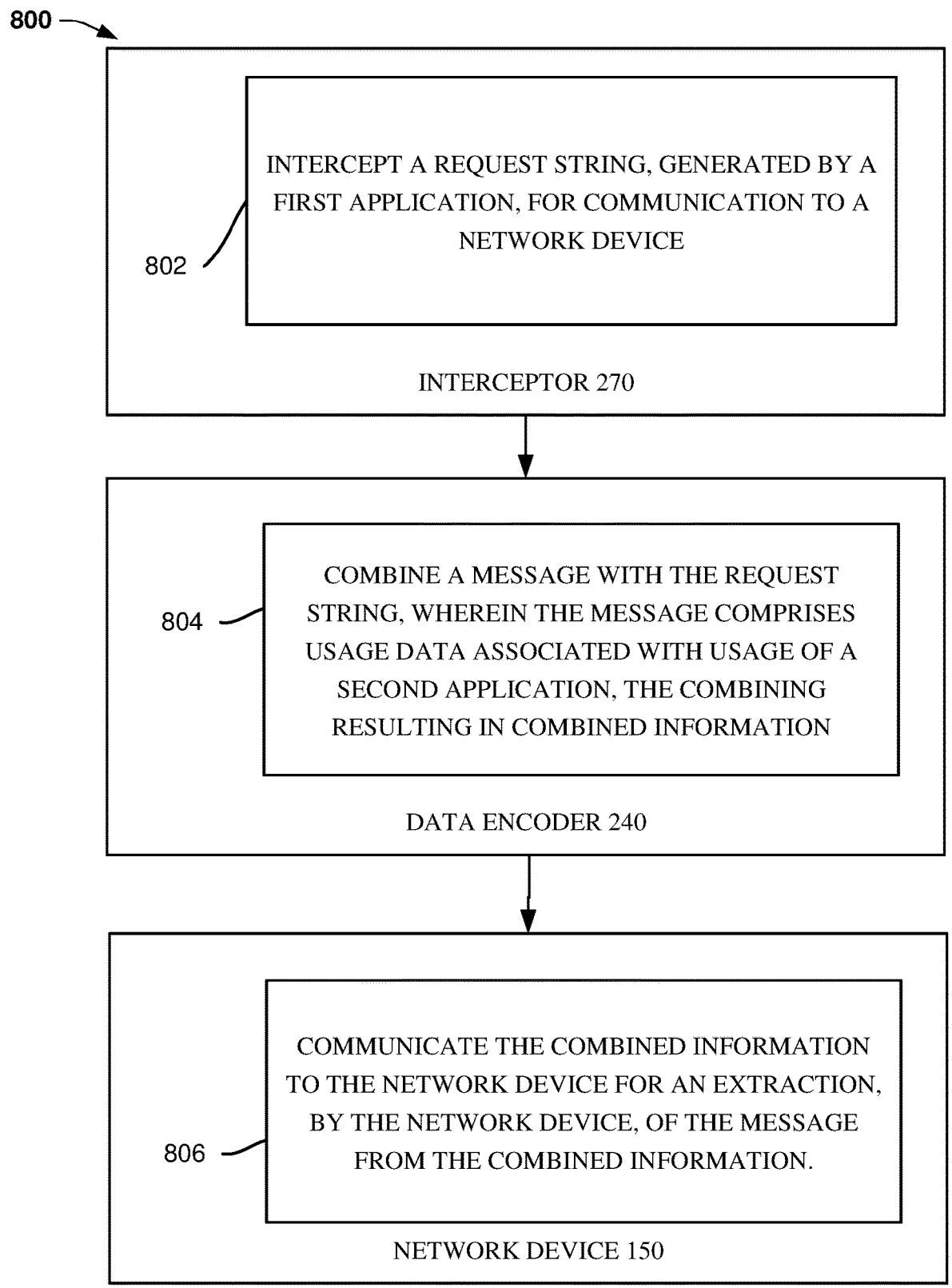
FIG. 8 is a flow diagram representing example operations of system that can facilitate transport of data out of isolated network environments, in accordance with one or more embodiments.

FIG. 8 is a flow diagram 800 representing example operations of system comprising an interceptor 270, data encoder 240, and network device 150, in accordance with one or more embodiments. For purposes of brevity, description of like elements and/or processes employed in other embodiments is omitted.

Interceptor 270 can be configured 802 to intercept a request string, generated by a first application, for communication to a network device. For example, in an embodiment, interceptor 270 can be configured 802 to intercept a request string (e.g., a GET method HTML statement), generated by a first application (e.g., web browser 260), for communication to a network device (e.g., application server 178).

Data encoder 240 can be configured 804 to combine a message with the request string, wherein the message comprises usage data associated with usage of a second application, the combining resulting in combined information. For example, in an embodiment, data encoder 240 can be configured 804 to combine a message (e.g., data 152A) with the request string (e.g., unrelated to data 152A), wherein the message comprises usage data (e.g., collected by data collector 125) associated with usage of a second application (e.g., application 125), the combining resulting in combined information (e.g., encoded data 252 in HTTP request 250).

Network device 150 can be configured 806 to communicate the combined information to the network device for an extraction, by the network device, of the message from the combined information. For example, in an embodiment, network device 150 can be configured 804 to communicate (e.g., by employing network adapter 1058) the combined information (e.g., HTTP request 250 having encoded data 252) to the network device (e.g., via LAN 1054 and network 190 to web server 110) for an extraction (e.g., by data decoder 314), by the network device, of the message (e.g., the date 152A log data) from the combined information.

Figure 9:
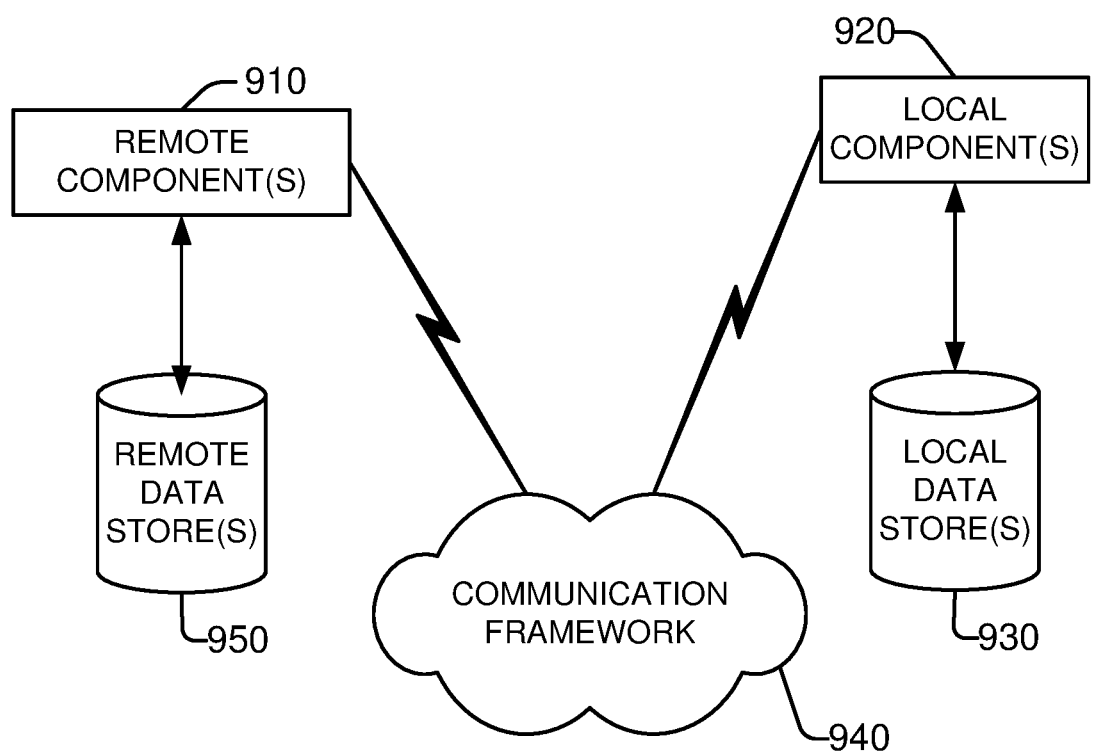
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
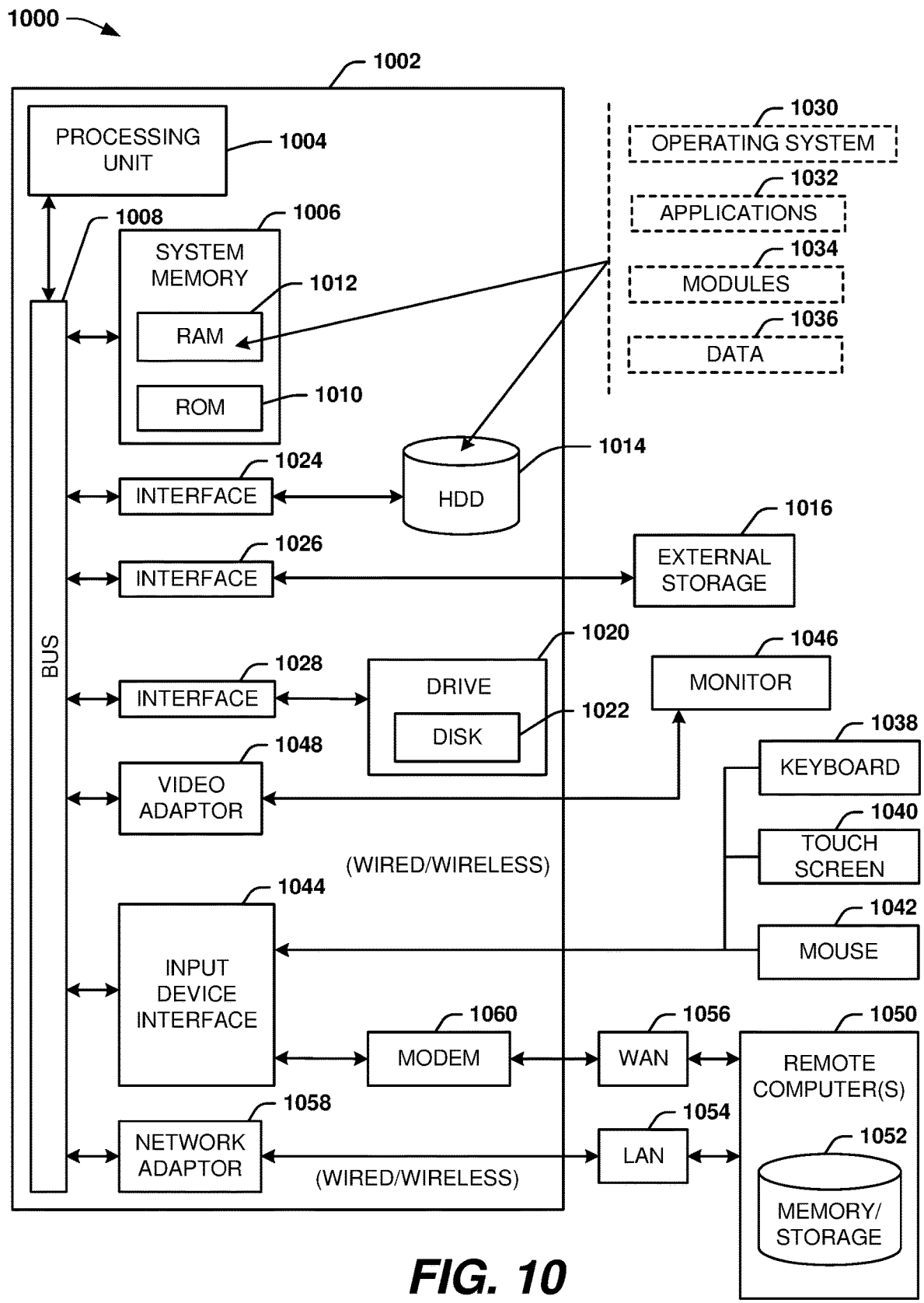
FIG. 10 illustrates an example block diagram of a computing system operable to execute the disclosed systems and methods in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While embodiments are susceptible to various modifications and alternative constructions, certain illustrated implementations thereof are shown in the drawings and have been described above in detail. It should be understood, however, that there is no intention to limit embodiments to the specific forms disclosed, but on the contrary, the intention is to cover all modifications, alternative constructions, and equivalents falling within the spirit and scope of embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, embodiments are not to be limited to any single implementation, but rather is to be construed in breadth, spirit, and scope in accordance with the appended claims.

What is claimed is:

1. Network equipment, comprising:
    a processor; and
    a memory that stores executable instructions that, when executed by the processor, facilitate performance of operations, comprising:
        receiving a request string comprising request data related to a request from a first application of a network device;
        intercepting a processing of the request string; and
        based on the intercepting, extracting usage data of a second application of the network device encoded in the request string, wherein the usage data is unrelated to the request, wherein the network device previously stored the usage data, wherein the network device monitored communication traffic being communicated to the network device, wherein, based on a result of monitoring the communication traffic, the network device paused communicating the request data in connection with the receiving, wherein the request string comprises a hypertext transfer protocol post command, wherein the network device transformed a hypertext transfer protocol get command into the hypertext transfer protocol post command, and wherein the extracting the usage data of the second application encoded in the request string comprises extracting the usage data from the hypertext transfer protocol post command.

2. The network equipment of claim 1, wherein the request string was generated by the first application of the network device generated by combining the request data and the usage data.

3. The network equipment of claim 1, wherein the first application comprises a web browser application.

4. The network equipment of claim 3, wherein the network device temporarily stored the usage data in session storage associated with a session state of the web browser application.

5. The network equipment of claim 1, wherein the operations further comprise:
    generating a header, wherein the header comprises an indicator signal for the network device;
    appending the header to a response string; and
    communicating the response string to the network device.

6. The network equipment of claim 5, wherein the indicator signal comprises a signal encoding an instruction to the network device to:
    continue to collect the usage data, resulting in updated usage data, and
    send the updated usage data to the network device.

7. The network equipment of claim 5, wherein the indicator signal comprises a signal encoding an instruction to the network device to iteratively communicate incremental usage data to the network equipment, and wherein the incremental usage data has not been previously communicated to the network equipment as part of a previous usage data communication.

8. The network equipment of claim 1, wherein the request string comprises a hypertext transfer protocol request string.

9. A method, comprising:
    intercepting, by a network device comprising a processor, a request string, generated by a first application, for communication to network equipment, wherein the request string comprises a hypertext transfer protocol get command;
    transforming the hypertext transfer protocol get command into a hypertext transfer protocol post command;
    combining, by the network device, a message with the hypertext transfer protocol post command, wherein the message comprises usage data associated with usage of a second application, the combining resulting in a post command with usage information; and
    communicating, by the network device, the post command with usage information to the network equipment for an extraction, by the network equipment, of the message from the post command with usage information.

10. The method of claim 9, wherein the first application comprises a web browser application.

11. The method of claim 10, wherein the usage data was aggregated by the network device before the request string was generated.

12. The method of claim 9, further comprising:
    receiving, by the network device, a response string from the network equipment;
    extracting, by the network device, an indicator signal from the response string; and
    based on the indicator signal, changing, by the network device, operation of the first application, resulting in a changed operation of the first application.

13. The method of claim 12, wherein the indicator signal comprises an application signal to the first application to continue to collect the usage data, wherein the changed operation of the first application comprises directing the first application to aggregate the usage data, resulting in aggregated usage data, and wherein the message comprises the aggregated usage data.

14. The method of claim 9, wherein the intercepting of the request string comprises:
    detecting, by the network device, a hypertext transfer protocol request, wherein the request string comprises the hypertext transfer protocol request;
    starting, by the network device, an interceptor process based on the detecting the hypertext transfer protocol request; and
    intercepting, by the network device executing the interceptor process, the hypertext transfer protocol request.

15. The method of claim 9, wherein the pausing comprises pausing for a defined amount of time.

16. The method of claim 9, further comprising:
    monitoring, by the network device, a size of the request string; and
    based on a result of the monitoring of the size, pausing, by the network device, communicating the request string for a defined amount of time.

17. A non-transitory machine-readable medium, comprising executable instructions that, when executed by a processor of network equipment, facilitate performance of operations, comprising:
- receiving a request command and request data from a first application of a network device;
- intercepting a processing of the request command and the request data; and
- extracting usage data associated with usage of a second application from the request data, wherein the usage data is encoded usage data that is encoded in the request data, wherein the network device previously stored the usage data, wherein the network device monitored communication traffic being communicated to the monitored equipment, wherein, responsive to a result of monitoring the communication traffic, the network device paused communicating the request data as part of the receiving, wherein the request command comprises a hypertext transfer protocol post command, wherein the network device transformed a hypertext transfer protocol get command into the hypertext transfer protocol post command, and wherein the extracting the usage data of the second application encoded in the request string comprises extracting the usage data from the hypertext transfer protocol post command.

18. The non-transitory machine-readable medium of claim 17, wherein the first application comprises a web browser application.

19. The non-transitory machine-readable medium of claim 18, wherein the usage data is aggregated for temporary storage in session storage of the web browser application.

20. The non-transitory machine-readable medium of claim 17, wherein the first application comprises a web browser application.

* * * * *